United States Patent [19]

Tutak et al.

[11] 4,249,596
[45] Feb. 10, 1981

[54] CONDENSER AND METHOD OF CONSTRUCTION

[76] Inventors: Peter Tutak, 210 S. Atlantic Ave., Cheswick, Pa. 15024; Don Burk, Great Belt Rd., Butler, Pa. 16001

[21] Appl. No.: 93,451

[22] Filed: Nov. 13, 1979

[51] Int. Cl.³ .............................................. F28B 9/08
[52] U.S. Cl. .................... 165/113; 165/114; 165/161
[58] Field of Search ............... 165/111, 112, 113, 114, 165/161

[56] References Cited

U.S. PATENT DOCUMENTS

| | | | |
|---|---|---|---|
| 1,374,357 | 4/1921 | Coast, Jr. | 165/113 |
| 2,392,638 | 1/1946 | Bowman et al. | 165/111 |
| 2,753,954 | 7/1956 | Tinker | 165/111 |
| 2,832,131 | 4/1958 | Leitner et al. | 165/114 |
| 4,049,048 | 9/1977 | Leedham | 165/161 |
| 4,136,734 | 1/1979 | Sasaki et al. | 165/111 |

*Primary Examiner*—Sheldon Richter

*Attorney, Agent, or Firm*—Jon M. Lewis

[57] ABSTRACT

A heat exchanger type condenser for separating water and other polutants from a vaporous mixture and a method of making the condenser is disclosed utilizing a hollow cylindrical vessel with inlet and outlet means. Conduit means having transversely extending heat exchanger fins are located in the vessel with the heat exchanger fins being square or rectangle when viewed in end view. Upper and lower baffle guides with baffles extending between the guides surround the heat exchanger fins in the vessel. The lower baffle guide has perforations formed therein so that the material that is condensed out of the mixture is immediately separated and drained. The conduit means has an entry and exit means that completely seals the inside of the conduit from the inside diameter of the cylindrical vessel. The cylindrical vessel has inlet and outlet means that help seal the inside of the cylinder from the surrounding atmosphere.

12 Claims, 8 Drawing Figures

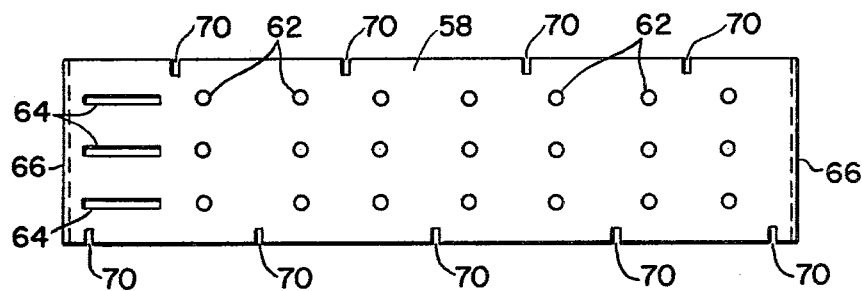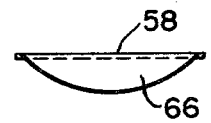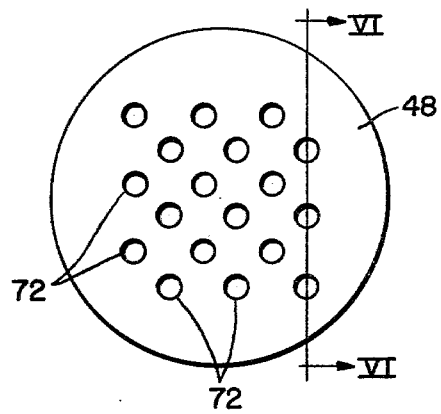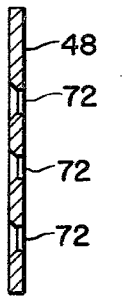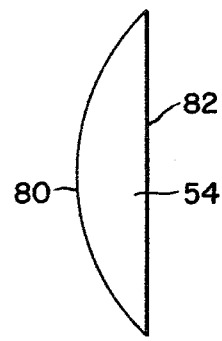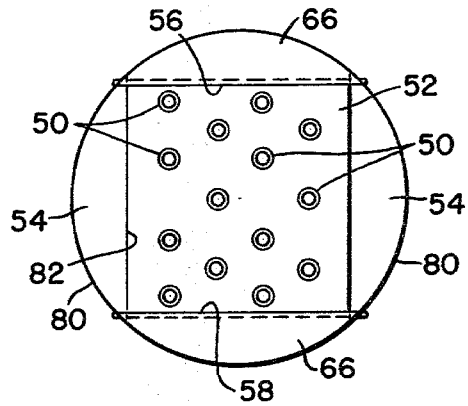

CONDENSER AND METHOD OF CONSTRUCTION

BACKGROUND OF THE INVENTION

This invention has to do with heat exchanger or condenser type vessels and is especially concerned with air-to-air and air-to-refrigerant condensers that separate water and other pollutants from air so as to produce dry compressed air as a final product.

Currently, however, heat exchangers on the market comprise the type that have conduit means with heat exchanger fins extending transversely of the conduit means. The heat exchanger fins surround the conduit means and form a square envelope when viewed from an end view. The heat exchanger fins and conduit means are housed in an elongated rectangular housing with the ends of the conduit means sealed with the rectangular box so as to form a sealed condenser heat exchanger unit between an air-to-air mixture or an air-to-refrigerant means.

While use of the above-mentioned type of heat-exchanger condenser type of device may produce satisfactory results it is believed that a less costly method of construction can be achieved and also produce a more efficient separation of the water and other pollutants from a vaporous mixture.

BRIEF SUMMARY OF THE INVENTION

According to the present invention a heat exchanger type condenser is disclosed for separating water and other pollutants from a vaporous mixture such as air and water, or air, oil and water. The condenser comprises a cylindrical housing that has opposing ends with an inlet and outlet means located each near one end of the cylindrical housing. The housing has a conduit means that extends from one end to the other end of the housing, the conduit having a sealed entry and exit means from the housing. Surrounding the conduit means are heat exchanger fins that extend transversely of the conduit means and reach from the conduit means outwardly toward the inside diameter of said housing. Preferably the envelope or end view projection of the heat exchanger is a rectangular or square whose diagonal approximates a dimension somewhat less than the inside diameter of the housing.

Baffles are located on opposite sides of the heat exchanger fins in the housing so as to direct a vaporous mixture alternately from one side to the other of the fins as the mixture is moved from the inlet means of the housing to the outlet means of the housing.

A longitudinally extending plate means is located below the heat exchange means is the housing so as to create a substantially separate lowermost compartment along the bottom of the housing.

Perforations are formed in the plate means that communicate the lowermost compartment of the housing with the rest of the housing and a drain is provided beneath said plate means.

The baffles used are preferably made so that in a plan view one side will be curved so as to follow the inside curvature of the housing and the other side will define a chord of that curvature.

Top and bottom baffle guides are preferably used to hold the baffles in place. The top baffle guide comprises a longitudinally extending plate above the heat exchanger fins that has notches formed along its lateral edges for mating with the baffles. The bottom baffle guide may be a plate means with notches also formed along its lateral edges for mating with the baffles.

On heat exchanger type condensers where the conduit means entry and exit means extends through a plate member it is preferable that rather than sealing the conduit means on the plate member by brazing that an O'ring seal be used in conjunction with the conduit and plate.

This invention also contemplates a method of construction of the above described heat exchanger type condenser. The method comprises the steps of selecting a conduit means with heat exchanger fins surrounding the conduit means that are substantially rectangular when viewed from an end view.

The conduit means are then surrounded with baffles on opposite sides of the heat exchanger fins and baffle guide means holding the baffle in place, the baffles and baffle guide means so surround the conduit means and fins so that the entire assembly projects a circular envelope when viewed from an end view.

The above assembly is then slideably placed in a cylindrical housing having an inside diameter substantially equal to the circular project end of the assemblies end view.

The entry and exit means of the conduit are then sealed from communication with the inside of the housing and the opposing ends of the cylindrical housing are closed so as to seal the inside of the housing from the surrounding atmosphere. Inlet and outlet means are provided that communicate with the inside of the housing.

Accordingly, it is an object of the present invention to provide a more efficient heat-exchanger type condenser.

It is a further object of the present invention to provide a less expensive type of heat-exchanger condenser than that which is currently used.

It is a further object of the present invention to provide a more efficient, easier to construct, and less expensive heat exchanger type device by utilizing materials that are staples in the marketplace.

BRIEF DESCRIPTION OF THE DRAWINGS

FIG. 3 is a bottom baffle guide according to the present invention.

FIG. 4 is an end view of the bottom baffle guide according to the present invention.

FIG. 5 is a view of an end seal plate according to the present invention.

FIG. 6 is a section view of FIG. 5 taken along the line VI—VI in FIG. 5.

FIG. 7 is a plan view of a baffle according to the present invention.

FIG. 8 is an end view of the assembly of the baffles, baffle guides, conduit means and heat exchanger fins according to the present invention.

What is shown in FIG. 1 are two heat exchanger type condenser units 10 and 20 that cooperate with one another to produce a final product of dried compressed air. Compressed air from a compresser is introduced through an inlet means 12 into the condenser 10 and circulates as is shown by the arrow 14. The air coming from the compresser is hot, moist and customarily has some oil contamination from the compresser itself. The air circulates around the conduit means 16 and alternately from side to side of the condenser 10 being guided by baffles 18. The air having been alternately circulated from side to side along arrow 14 finally passes through an outlet means 22 on the condenser 10 and is transferred to a second condenser 20 having an inlet means 24. The condenser 20 has a conduit means 26 which is similar to the conduit means 16 except that on the condenser unit 20 there is only a single entry 28 and a single exit 30 for the conduit means. The conduit means 16 in the condenser unit 10 has multiple tubes each having their own inlets 32 and exit means 24. Compressed air that has undergone somewhat of a cooling by passing through the condenser unit 10 is now passed down through the inlet 24. Circulating through the conduit means 26 can be a refrigerant that is cycled between a reservoir (not shown) and up through the conduit means 26. As the air passes alternately again from side to side on the condenser unit 20, guided by baffles 36, further water and pollutants are condensed out and the air is transferred through outlet means 38 up to the entry means 32 of the conduit 16. The mixture of vapor as it now passes from the entry means 32 to the exit means 34 helps to pre-cool compressed air coming from the compresser and is directed downstream of conduit means 16 to be stored as a final dry compressed air product. An exploded view of the condenser unit according to the present invention can be seen in FIG. 2 and comprises a cylindrical housing 40 having an inlet means 42 and outlet means 44. The inlet means 42, of course, corresponds with the inlet means 12 of condenser 10 and inlet means 24 of condenser 20. The outlet means 44, of course, corresponds to the outlet means 22 of condenser 10 of the outlet means 38 of condenser 20. It should be understood that in describing FIG. 2 all of the elements are the same or similar to the elements that are mentioned in the condenser 10 and 20 above with the sole difference being that the condenser 10 has multiple individual conduit tubes extending therethrough whereas the condenser 20 has only a single continuous conduit tube with a single entry 28 and single exit 30. Otherwise the following description should be understood to apply to either one of the condensers 10 or 20 mentioned above. Referring now to FIG. 2 the cylindrical housing 42 has a closed end 46 preferably comprising a plate welded to the end of cylindrical housing 40. Located in the inside diameter of the cylindrical housing 40 is a first end seal plate 48, this end seal plate 48 being shown as 48 in 51 in both condensers 10 and 20. The seal plate 48, of course, meets with the conduit means 50 that extends from one towards the other end of cylindrical housing 40 and is surrounded by heat exchanger fins 52 that extend transversely to the longitudinal direction of the conduit means preferably at right angles thereto. The heat exchanger fins preferably being thin metal sheets preferably aluminum and suitably spaced along the length of the conduit means. The heat exchanger fins 52 preferably are rectangular and when viewed in an end view, project a rectangular envelope. Surrounding this rectangular envelope are baffles 54 and top baffle guide 56 and a plate means or lower baffle guide 58 that also extend along the length of cylindrical housing 40. The baffles being spaced in a staggered manner along opposite sides so as to alternately direct the air from one side to the other as it goes from one longitudinal end to the other of the cylindrical housing 40. Again a seal plate 48 is shown on the other end of the conduit means so as to seal the inside of the conduit means from the cavity of the cylindrical housing 40. An end plate 60 fits over the end 62 of the cylindrical housing 40 and is preferably welded thereon. The lower baffle guide 58 as can be seen in the FIG. 2 is a rectangular member having perforations 62 formed in the plate. Near the one end the guide 58 has rectangular perforations 64 formed therein. The plate 58 has legs 66 that mate with the inside diameter of the cylindrical housing 40 so as to provide a compartment that is beneath the bottom baffle plate into which the condensed pollutants and water will drain. The cylindrical housing has in the compartment beneath the lower baffle guide 58 a trap drain. When enough water and pollutants collect a valve will float and allow the pollutants and water to exit. As soon as the water and pollutants have exited the pressure within the housing will force the valve to close the trap to prevent any pressure leak from the vessel. Such pressure traps are common within the trade and are designated as 68. Shown in FIG. 3 is a plan view of the lower baffle plate 58 according to the present invention. Having notches 70 formed there along to mate with similar notches 70 formed in the top baffle guide 56 shown in 52. The notches 70 serve to hold the baffles 54 in place while the perforations in the lower baffle guide 58 serve to allow the water of the pollutants to drain to a compartment below the lower baffle guide 58. It is believed that in this manner that a more efficient condensing operation will take place because the air that has allowed water to condense out will no longer be exposed to the condensate and may thereafter allow more condensate to come out of the air. Along the end of the baffle plate FIG. 58 are the elongated rectangular notches 64 that are placed therein so as to insure the removal of all condensate from the top side of plate 58. It has been preferable that the perforations in plate 58 form approximately six plus or minus four percent of the total surface area of the plate. FIG. 4 is again an end view of the plate 58 showing that at each end of the plate there is a leg 72 whose bottom has the same curvature as the inside diameter of the cylindrical vessel 40. Legs 72 are on each end of the baffle guide 58 and form the separate compartment through which the condenser is drained. FIG. 5 shows a typical seal plate 48 through which the conduit means 50 may extend. These plates 48 have perforations 72 through which the conduit means 50 pass. Referring to FIG. 6 it is preferable that on the pressure side of the conduit conical champher are formed so that the O'rings 76 on the conduit means 50 have a place to seal. The seal plate 48 may have a braced connection between the conduit means 50 and sealed plate 48, however, it is preferable that an O'ring on the conduit is used letting the differential pressure between one side of the seal plate 48 and the other hold the O'ring in place. What is shown in FIG. 7 is the baffle plate 54 having two sides, one side 80 that assumes the inside diameter configuration of the cylindrical vessel 40. The other side 82 of baffle plate 54 is a chord of that same inside diameter. Shown in FIG. 8 is an end view of the sub assembly of the heat exchanger fins having a conduit means therein and the baffles 54 along with the lower most baffle guide 15 and the uppermost baffle guide 56. Referring back to the bottom baffle guide 58 the perforations 62 are in effect self cleaning due to the pressure drop through the vessel. For this reason the perforation will operate even though temporarily being clogged by the various pollutants that are condensed out of the vaporous mixture.

Figure 1:
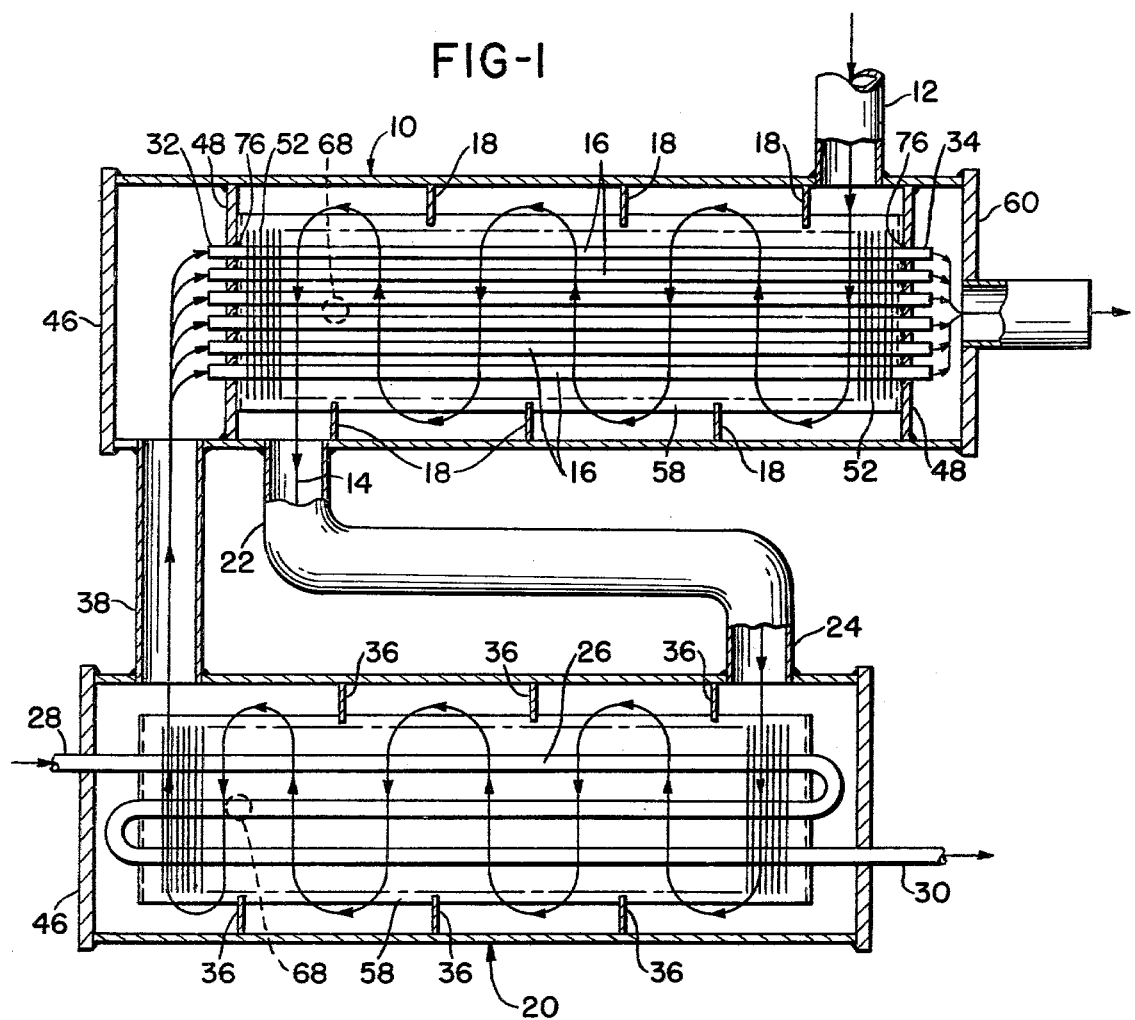
FIG. 1 is a plan view of a cut-away of a combination of the heat exchanger type condenser according to the present invention.
Figure 2:
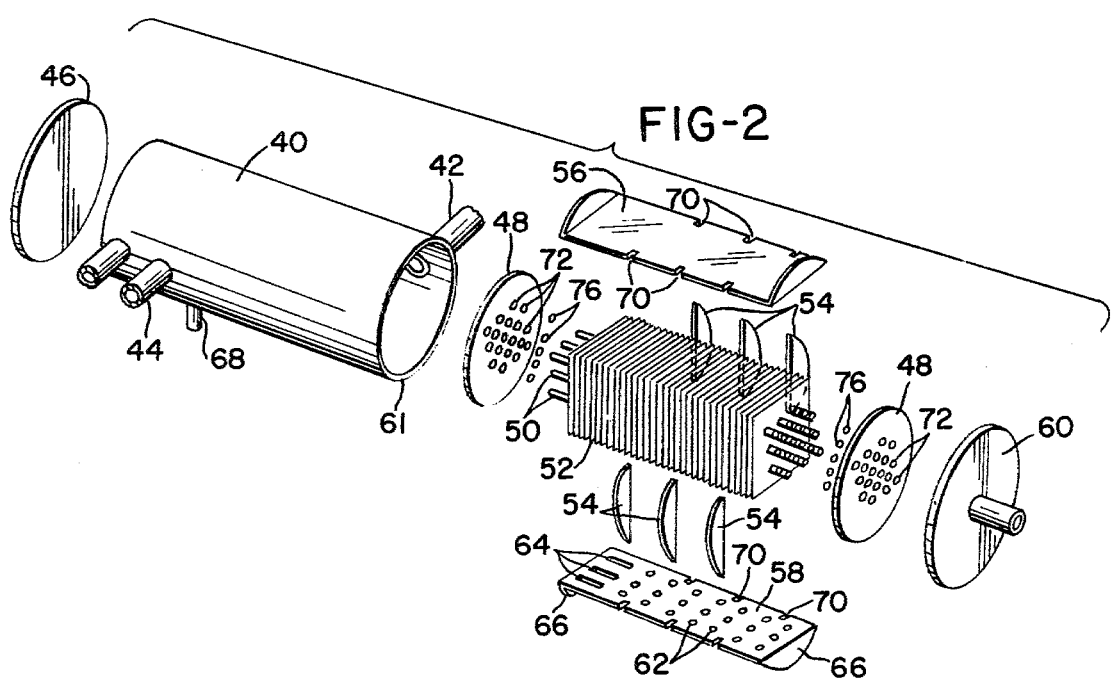
FIG. 2 is an exploded view of a heat exchanger type condenser according to the present invention.

What is claimed is:

1. A condenser for separating water and other pollutants from a vaporous mixture and comprises:
   a. a cylindrical housing having opposing ends and inlet means and outlet means;
   b. sealed and separate conduit means in said housing extending from one toward the other of said opposing ends and having entry and exit means from said housing;
   c. heat exchanger fins extending from said conduit means outwardly toward said housing;
   d. baffles located in said housing on opposite sides of said heat exchanger fins so as to direct the vaporous mixture alternately from one side to the other of said opposite sides as the vaporous mixture is moved from said inlet means to said outlet means;
   e. plate means located below said heat exchanger fins creating a lowermost compartment along the bottom of said housing;
   f. perforations formed in said plate means for draining of the water and other pollutants to said lower compartment;
   g. means for draining said water and pollutants from said housing.

2. A condenser according to claim 1 in which said conduit means comprises tubular coil means.

3. A condenser according to claim 1 in which said plate means comprises a planar surface extending from side to side and along the length of said cylindrical housing and having dependent leg means extending downwardly to a lowermost section of the inside diameter of said cylinder.

4. A condenser according to claim 1 which further comprises:
   a. said heat exchanger fins being rectangular when viewed in a direction along the axis of said housing.

5. A condenser according to claim 4 which further comprises said baffle plates extending upwardly from said plate means and when viewed in a direction along the axis of said housing have one side following the curvature of the inside diameter of said housing and an opposite side defining a chord of that curvature.

6. A condenser according to claim 5 which further comprises:
   a. a top baffle guide located in an uppermost section of said housing, said top baffle guide co-operating with said plate means to hold said baffles in place within said housing.

7. A condenser according to claim 6 in which said top baffle guide, said plate means and said baffle on opposite sides of said housing form a rectangular cavity when viewed in a direction along the center axis of the housing; said rectangular heat exchanger fins and said conduit means located within said cavity.

8. A condenser according to claim 7 in which said top baffle guide, said plate and said baffles are slideably placed within said cylindrical housing.

9. A condenser according to claim 8 in which said conduit means comprises sealer walls located at each end of said housing, a plurality of tubes passing through holes formed in said sealer walls and seal means between said walls and said tubes.

10. A condenser according to claim 9 in which said seal means comprises O'ring seal means between said tubes and said sealer walls.

11. A condenser according to claim 8 which further comprises that the top baffle guide, said plate means, and said baffles when surrounding said heat exchanger fins and conduit means form a circular projection when viewed in an end view.

12. A condenser according to claim 11 which further comprises that said circular projection is substantially equal to the inside diameter of said cylindrical housing.

* * * * *